United States Patent Office 2,763,701
Patented Sept. 18, 1956

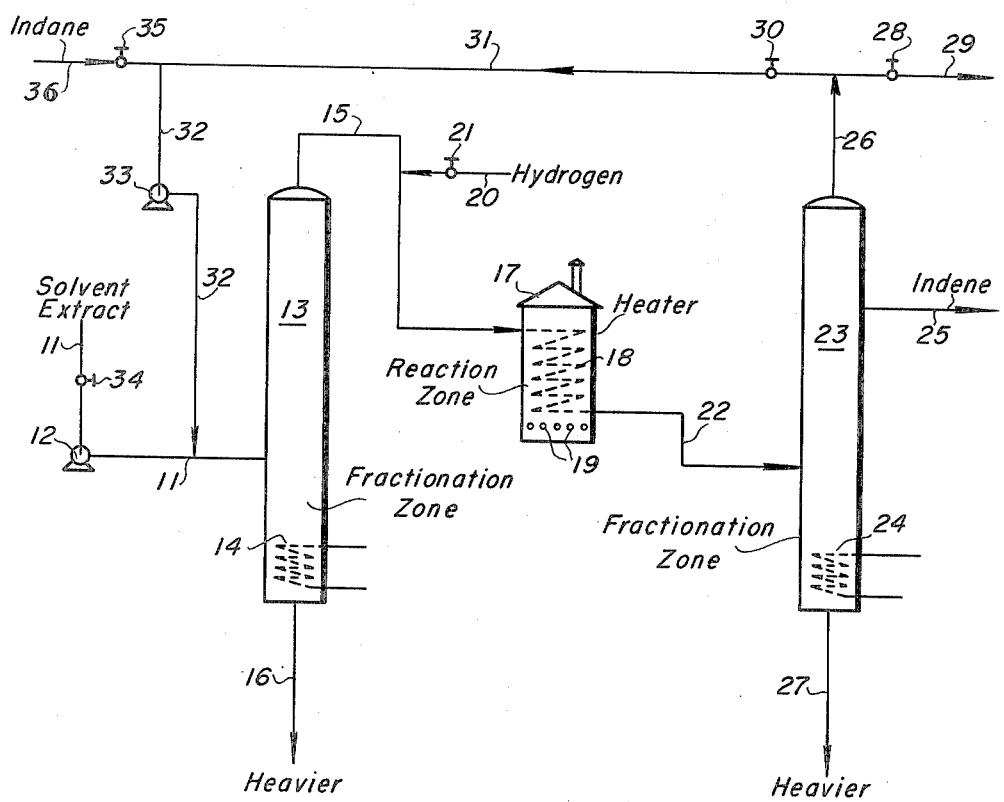

2,763,701

PRODUCTION OF INDENE

Edward J. Hoffmann, Baytown, and Armand M. Souby, Chambers County, Tex., assignors, by mesne assignments, to Esso Research and Engineering Company, Elizabeth, N. J., a corporation of Delaware Application October 5, 1953, Serial No. 384,260

6 Claims. (Cl. 260—668)

The present invention is directed to a method of producing indene. More particularly, the invention is directed to a method for producing indene from an indane-containing hydrocarbon fraction. In its more specific aspects, the invention is concerned with producing indene by subjecting indane to a high temperature and specific conditions.

The present invention may be briefly described as involving a method for producing indene in which an indane-containing hydrocarbon fraction boiling in the range from about 300° to about 650° F. is subjected to an elevated temperature in the range between 1100° and 1400° F. in a reaction zone free from active catalytic material. The indane-containing fraction is subjected to said high temperature at a pressure in the range between 400 and 1000 pounds per square inch gauge for a time in the range between 3 and 120 seconds in the presence of 2000 to 10,000 standard cubic feet of hydrogen per barrel of said hydrocarbon fraction to form a product containing indene. Indene is recovered from the product by distilling same under precise fractional distillation conditions.

The invention also comprises a method for producing indene by subjecting indane to the specified conditions of temperature, pressure, and time of contact in the presence of hydrogen.

The hydrocarbon fraction from which the indene is produced from indane may be any hydrocarbon fraction containing indane boiling in the range from about 300° to about 650° F. The fraction may suitably be a hydroformed fraction, such as a project resulting from the hydroforming of a naphthenic hydrocarbon fraction in the presence of a molybdenum or platinum catalyst. It is desirable that the indane be concentrated in the hydrocarbon fraction before subjecting same to the desired conditions and this may suitably be done by solvent extracting the indane-containing fraction followed by distillation to recover the desired fraction for subjecting to the aforesaid conditions.

The solvent extract may be obtained suitably in a solvent extraction operation at a low temperature in the range from —30° to +10° F. utilizing liquefied sulfur dioxide as the solvent. Other solvents with other conditions as well as adsorbents may be used, such as furfural, nitrobenzene, phenol and the like solvents, and adsorbents such as silica gel and the like, well known for concentrating aromatic hydrocarbons and separating them from paraffinic or saturated hydrocarbons.

The operation in accordance with the present invention is conducted under non-catalytic conditions. Stating this otherwise, the operation is purely a thermal operation in the presence of hydrogen. It is important, therefore, that the reaction zone in which the indane is exposed or subjected to the conditions enumerated be free from active catalytic material. Thus, the reaction zone walls must be free from active catalytic materials such as free metallic iron and the like and the reaction zone space itself must be free from active catalytic material. In other words, in the present invention there is an absence of active catalytic material either as contacting surfaces on the walls or as materials which fill the reaction zone and provide a catalytic surface. This may be accomplished by providing a reaction zone having ceramic surfaces or by constructing the reaction zone of alloys such that free metallic iron as such does not exist at the surfaces.

The conditions to be employed in the practice of the present invention encompass a temperature in the range between 1100° and 1400° F. A preferred temperature range is in the range between 1200° and 1300° F. Pressures may range from about 400 to about 1000 pounds per square inch gauge with a preferred pressure range from about 400 to about 700 pounds per square inch gauge.

The time the indane-containing fraction is subjected to the high temperatures and pressures may range from about 3 to about 120 seconds with a preferred time of contact in the range between about 5 and about 50 seconds.

Hydrogen is necessary in the practice of the present invention and an amount of hydrogen in the range from 2000 to 10,000 standard cubic feet of hydrogen per barrel of feed hydrocarbon is suitably employed. A preferred range is from about 4000 to about 10,000 standard cubic feet of hydrogen per barrel of hydrocarbon. When indane is the feed stock substantially free of other hydrocarbons the amount of hydrogen may suitably be in the range from about 2000 to about 10,000 standard cubic feet of hydrogen per barrel of indane. Some leeway, of course, is allowed since, when substantially pure indane is employed, the amount of hydrogen given is substantially in excess of that when the indane is diluted with other hydrocarbons. Therefore, it is contemplated that we adjust the amount of hydrogen for the substantially pure indane feed to compensate for the diluting effects of the amount of hydrogen given when an indane-containing hydrocarbon fraction is employed. A hydrogen containing gas such as produced in hydroforming or other catalytic dehydrogenation process may be employed.

The invention will be further illustrated by reference to the drawing in which the single figure is a flow diagram of a preferred mode.

Referring now to the drawing, numeral 11 designates a charge line through which a solvent extract, such as a sulfur dioxide extract, containing indane is introduced into the system. The solvent extract is pumped through line 11 by way of pump 12 to a fractionation zone 13 which may be a plurality of fractional distillation towers but, for convenience, it is shown as a single fractional distillation tower, provided with a heating means illustracted by coil 14 for adjustment of temperature and pressure. Zone 13 is intended to include all auxiliary facilities usually associated with the modern fractional distillation tower and will be understood to include means for inducing reflux, condensing and cooling means and internal vapor-liquid contacting means, such as bell cap trays and the like.

Conditions are adjusted in zone 13 to remove as an overhead fraction by way of line 15 a fraction boiling in the range between 300° and 650° F. which contains indane. Heavier fractions are discarded from zone 13 by line 16 for further use as may be desired.

The indane-containing fraction in line 15 is routed thereby into a heater 17 provided with a coil reaction zone 18 which is free of active catalytic materials. Heater 17 is provided with burners 19 by way of which heat is transmitted to the coil 18 by burning, for example, natural gas supplied to burners 19 by means not shown.

In reaction zone 18 the indance-containing fraction introduced by line 15 is exposed to an elevated temperature, as indicated, in the presence of hydrogen which is introduced into line 15 from a source not shown by line 20 controlled by valve 21. On passage through reaction zone 18 for a time indicated in the presence of a stated amount of hydrogen, the indane is substantially converted to indene in a reaction which involves a simultaneous dehydrogenation and dealkylation of the indane to form indene. A product is thereby formed containing the indene which is removed from reaction zone 18 by line 22 and discharged thereby after cooling to distillation temperatures in means not shown into a fractionation zone 23 which may be a plurality of fractional distillation zones and similar in all respects to zone 13.

Fractionation zone 23 is provided with a heating means illustrated by coil 24 for adjustments of temperature and pressure and to allow recovery of the indene from the product. Since indene boils at about 182° C. and indane boils at about 178° C., the indene may be suitably recovered from zone 23 by line 25 and the lighter indane recovered by line 26. Heavier materials are suitably withdrawn from zone 23 by line 27.

The indane which is withdrawn from zone 23 by line 26 may be discharged from the system by opening valve 28 in line 29 but preferably the indane is recycled to the reaction zone 18 by opening valve 30 in recycle line 31 which connects into a branch line 32 containing a pump 33 for introducing the recovered indane into line 11.

Since, under some circumstances, it may be desirable to charge substantially pure indane, provision is made in line 11 by means of valve 34 to close line 11 and further provision is made to introduce indane into line 11 by a second feed line 36 controlled by valve 35 which connects into a source, not shown, of substantially pure indane. Thus, when substantially pure indane is charged, it will be mixed with the recycled indane introduced by line 31 into line 32 as has been described.

When a solvent extract is the feed stock containing indane, it will be seen that the present invention allows a mode for purifying the feed stock to provide a secondary feed stock comprising substantially pure indane. The indene produced and recovered in accordance with the present invention may suitably be used as a chemical raw material or as a chemical intermediate in producing many useful chemical products.

The invention will be further illustrated by the following examples:

A sulfur dioxide extract of a kerosene fraction of crude petroleum was subjected to a temperature of 1300° F., 600 pounds per square inch gauge, 5000 standard cubic feet of hydrogen per barrel of feed for 10 seconds. This feed stock contained indane but no indene. The product produced under the aforesaid conditions was distilled to obtain a fraction having a vapor temperature in the range between 350° and 400° F. The indene content of this fraction was 38.4% by weight. The remainder of this fraction comprised alkyl aromatics.

In other operations under similar conditions a hydrocarbon feed containing 10% by weight of alkyl indanes was subjected to conditions as outlined for the present invention. A substantial portion of the indanes was converted to indenes.

Additional runs have been made on a sulfur dioxide extract from a kerosene obtained from Tomball crude. Runs were made on the total Tomball extract and on the portion of the extract boiling above 400° F. The results of these runs and the conditions obtaining are presented in the following table:

TABLE I

| Run No | 1 | 2 | 3 | 4 |
|---|---|---|---|---|
| Feed | Total Tomball Extr. | | 400° F.+ Tomball Extr. | |
| Pressure, p. s. i. g | 600 | 600 | 600 | 600 |
| Temperature, °F | 1,200 | 1,250 | 1,250 | 1,300 |
| Gas Charged, S. C. F./Bbl | 9,240 | 7,400 | 7,270 | 7,810 |
| H₂ Content of gas, Mol percent | 73.3 | 71.2 | 65.1 | 62.8 |
| 350°–400° F. Product Indene Content, Vol. Percent | 13.8 | 30.8 | 21.2 | 34.5 |
| Indene in Feed, Vol. Percent | 0 | 0 | 0 | 0 |
| Residence Time, Secs | 33.0 | 33.2 | 33.1 | 31.2 |

It will be noted from Table I that the product boiling between 350° and 400° F. contains a substantial amount of indene, whereas the feed stock was free of indene.

To illustrate that the indene may be concentrated by distillation from a product produced in accordance with the present invention, the nominal 300°–400° F. fraction of product from conversion of a sulfur dioxide extract of Tomball crude was distilled in a 50 plate column at 20 to 1 reflux ratio. This fraction was 100% aromatic and contained 9.3 weight percent indene. The following table shows the vapor temperature and indenes concentration in the 5% cuts from the distillation:

| Percent Distilled | Vapor Temperature, °F. | Indenes Content of Cut, Wt. Percent |
|---|---|---|
| 5 | 292 | 0 |
| 10 | 310 | 0 |
| 15 | 322 | 0 |
| 20 | 325 | 0 |
| 25 | 326 | 0 |
| 30 | 328 | 0 |
| 35 | 330 | 0 |
| 40 | 334 | 0 |
| 45 | 335 | 0 |
| 50 | 340 | 0.80 |
| 55 | 346 | 0.86 |
| 60 | 350 | 0.87 |
| 65 | 352 | 0.88 |
| 70 | 354 | 3.55 |
| 75 | 357 | 8.68 |
| 80 | 359 | 8.54 |
| 85 | 363 | 39.54 |
| 90 | 367 | 51.00 |
| 95 | 389 | 19.30 |

While the present invention has been described particularly to converting alkyl indanes to indenes and with respect to converting indane to indene in particular solvent extracts, it is contemplated that the word "indane" includes alkyl substituted indanes having from 1 to 7 alkyl groups, said alkyl groups containing from 1 to 4 carbon atoms and that the invention is equally applicable to the following listed indanes for converting to the corresponding indenes: 1,methylindane, 2,methylindane, 4,methylindane, 5,methylindane, 4,5,6,trimethylindane, 1,1,dimethylindane 1,2,dimethylindane, 1,2,3,trimethylindane, 1,2,3,4,5,6,7,heptamethylindane. Ethyl, propyl and butyl groups can also be substituted into the indane molecule in the positions given for the methylindane examples.

The nature and objects of the present invention having been completely described and illustrated, what we wish to claim as new and useful and to secure by Letters Patent is:

1. A thermal method for producing indene which comprises subjecting an indane-containing hydrocarbon fraction in a reaction zone free from active catalytic material to a temperature in the range between 1100° and 1400° F. at a pressure in the range between 400 and 1000 pounds per square inch gauge for a time in the range between 3 and 120 seconds in the presence of 2000 to 10,000 standard cubic feet of hydrogen per barrel of said hydrocarbon fraction to form a product containing indene, and recovering indene from said product.

2. A method in accordance with claim 1 in which the indene is recovered by distilling said product.

3. A method in accordance with claim 1 in which the indane is an alkyl indane having from 1 to 7 alkyl groups, said alkyl groups containing from 1 to 4 carbon atoms.

4. A thermal method for producing indene which comprises subjecting an indane-containing hydrocarbon fraction boiling in the range between 300° and 650° F. in a reaction zone free from active catalytic material to a temperature in the range between 1200° and 1300° F. at a pressure in the range between 400 and 700 pounds per square inch gauge for a time in the range between 5 and 50 seconds in the presence of 4000 to 10,000 standard cubic feet of hydrogen per barrel of said hydrocarbon to form a product containing indene, and distilling said product to recover said indene therefrom.

5. A method in accordance with claim 4 in which the hydrocarbon fraction is a solvent extract.

6. A thermal method for producing indene which comprises subjecting indane in a reaction zone free from active catalytic material to a temperature in the range between 1100° and 1400° F. at a pressure in the range between 400 and 1000 pounds per square inch gauge for a time in the range between 3 and 120 seconds in the presence of 2000 to 10,000 standard cubic feet of hydrogen per barrel of said indane to form a product containing indene, and distilling said product to recover said indene therefrom.

References Cited in the file of this patent

FOREIGN PATENTS

| | | |
|---|---|---|
| 648,594 | Germany | Aug. 11, 1937 |
| 733,400 | Germany | Mar. 27, 1943 |

OTHER REFERENCES

Hall: Jour. Soc. Chem. Ind., vol. 54 (1935) 208T–217T.

Rozenberg: Chem. Abs., vol. 43 (1949) 6608L–6609e.